April 19, 1966  A. HANSEN, JR  3,246,916
PROTECTOR FOR RING AND GROOVE TYPE SEALED JOINTS
Filed May 23, 1963  2 Sheets-Sheet 1
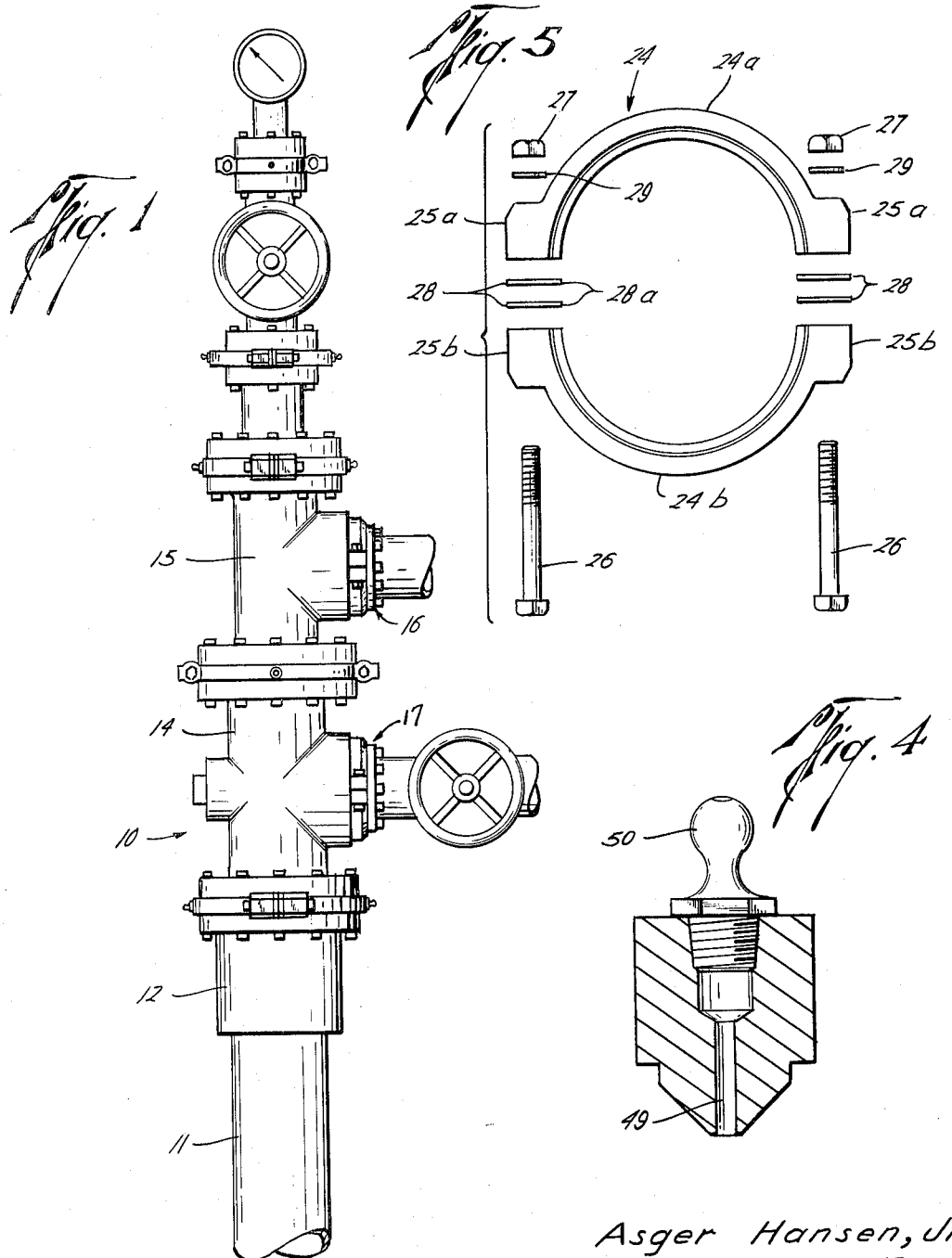
Asger Hansen, Jr.
INVENTOR.
BY

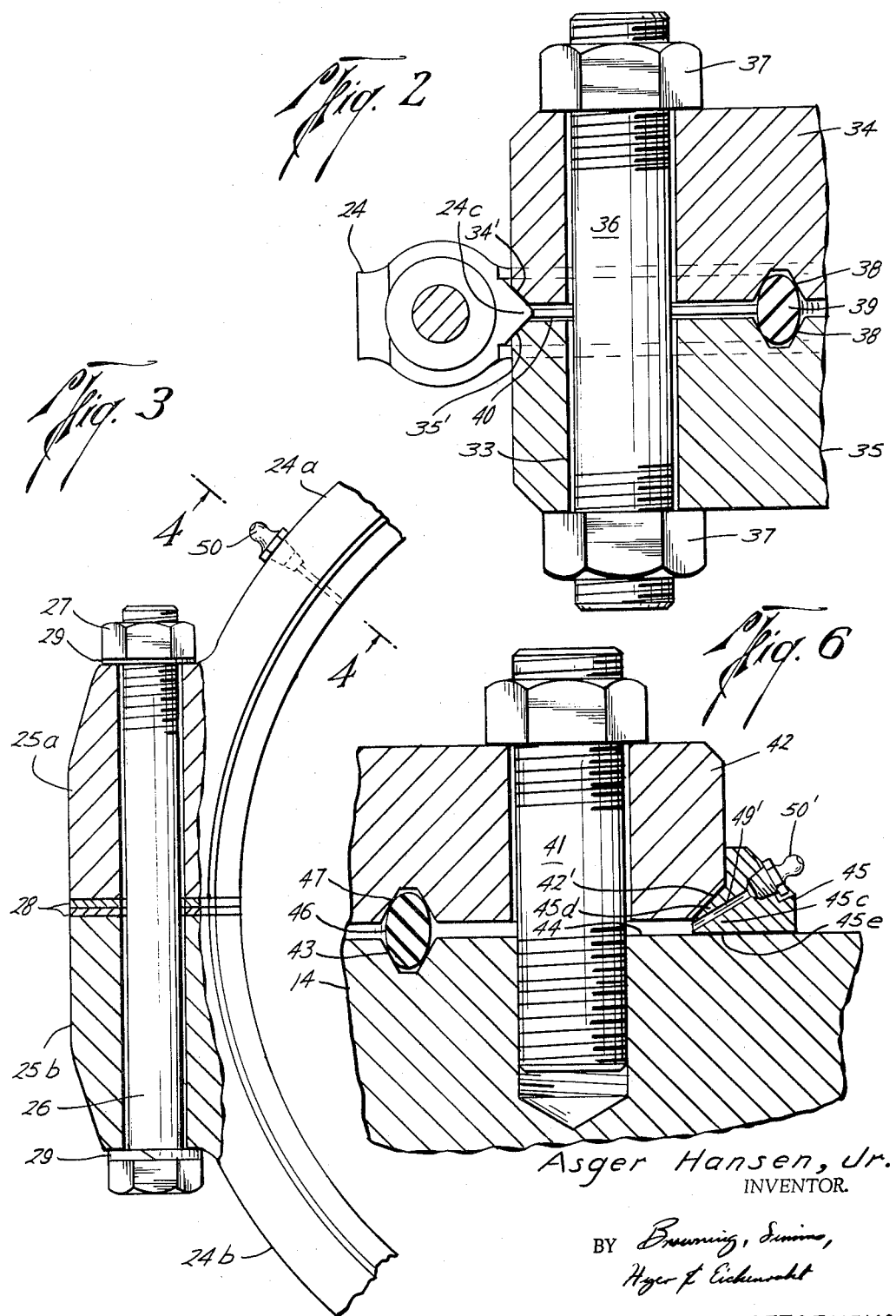

United States Patent Office 3,246,916
Patented Apr. 19, 1966

1

3,246,916
PROTECTOR FOR RING AND GROOVE TYPE SEALED JOINTS
Asger Hansen, Jr., 3400 Montrose Blvd., Houston, Tex.
Filed May 23, 1963, Ser. No. 282,785
5 Claims. (Cl. 285—45)

This invention relates to a protector for sealed joints and refers more particularly to a device for protecting ring and groove type joints, the protector being applied to the outside of the joint.

Pressure joints or connections of the ring and groove type are widely used throughout industry and particularly in the oil field to connect tubular members carrying fluids under high pressures and temperatures. Usually connections of this type are used when it is contemplated that the connection will remain in service for a long period of time as, for example, when connecting together the various pieces of equipment which make up a wellhead, or "Christmas tree," on an oil or gas well. These connections are relied upon to keep the pressure of the well under control without leakage for many years. Such connections are continuously exposed during the life of the well to the weather and to vibrations and lateral forces which sometimes have caused failures of the joints. Due to the high pressures and the inflammable character of the fluids controlled, failure of such joints can result in great economic loss and sometimes an oil or gas well itself may be lost.

It is an object of this invention to provide a protector for a ring and groove type sealed joint which tends to relieve the bolts holding the parts of the joint together from stress changes produced by varying lateral forces on the members connected together by the flanges.

It is a further object of the invention to provide a protector for a ring and groove type sealed joint which will resist any tendency of the flange parts of the joint to rock on the ring gaskets.

It is another object of the invention to provide a protector for a ring and groove type sealed joint which will sealingly engage opposing annular areas on the parts of the joint and maintain a non-corrosive fluid adjacent the outside surface of the ring gasket.

These and other objects, features and advantages of the invention will be apparent to one skilled in the art from a consideration of the specification, drawings and appended claims.

Two embodiments of the invention are shown in the drawings, wherein like reference numerals are used throughout to designate like parts:

FIG. 1 illustrates a typical wellhead connection with the preferred embodiments of the protector of this invention installed on all ring and groove sealed pressure joints of the wellhead;

FIG. 2 is a partial vertical section taken through a typical ring and groove type pressure connection with one embodiment of the invention installed showing the relative positions of the flange parts of the joint which provide the two opposed surfaces of the joint, the ring gasket located in opposed grooves in the surfaces, the flange bolts and the protector;

FIG. 3 is a plan view of a portion of the assembled protector, partly in section, to show the method of bolting together the two arcuate members of the preferred embodiment and also showing the position of the gaskets used to seal between the arcuate members and also between the flange parts of the joint when the protector is being used to protect the joint against corrosion;

FIG. 4 is a section taken along line 4—4 of FIG. 3 showing one means for filling the space between the flanges of the joint outside the ring gasket with a non-corrosive fluid after the preferred embodiment of the protector is installed around the flange parts of a pressure joint;

FIG. 5 is a plan view of the various parts which make up the protector; and

FIG. 6 is a partial vertical section through another typical ring and groove type connection illustrating an alternate form of the invention which can be used where one of the opposing surfaces of the joint either has no beveled edge on its outer periphery or is substantially larger in diameter than the other or both.

The protector of this invention has utility with any ring and groove type pressure connection; however, it is particularly useful in connection with wellheads. For this reason, the protector is shown in the drawings, by way of illustration and not as a limitation, as it would appear installed on a typical wellhead.

The wellhead, indicated generally by the number 10, is supported by and connected to outside casing 11 which is in turn cemented in the ground. Attached directly to the casing is casing head 12 which in turn supports casing head 14, tubing head 15 and miscellaneous other equipment, such as valves, pressure gauges, etc.

Extending laterally out from casing head 14 and tubing head 15 are branches 16 and 17 which are in turn connected to flowlines (not shown) which lead to storage facilities usually located some distance from the well. It is common practice to provide these laterally extending branches with two or more valves and with adjustable choke equipment, etc., which can extend laterally out from the wellhead a considerable distance.

There are pressure connections between each piece of equipment making up a wellhead and, as is the case in the wellhead illustrated, these connections are commonly of the ring and groove type. That is, each connection consists of two opposing flat surfaces provided by flange parts on the members being connected. The flat surfaces are provided with opposing grooves to receive a metal ring gasket which is forced into sealing engagement with the grooves by the bolts or studs which hold the flange parts in position against the gasket. There are occasions when the joint will consist of two substantially identical flange parts as, for example, the connection between casing head 14 and tubing head 15. On other occasions, the flange parts will consist of two flange parts which will have only the flat surfaces and ring grooves in common. For example, branches 16 and 17 are connected to casing head 14 and tubing head 15 by means of a ring and groove joint which uses a flat surface on the head itself as one of the flange parts. Joints of both types are well known in the art and wherever "flange joints" or "flange connections" are referred to, both types are meant unless otherwise stated.

The preferred embodiment of the protector of this invention for use with flange connections having substantially identical flange parts is shown in FIG. 5 in plan view. It consists of two identically shaped arcuate members 24a and 24b which are arranged to encircle the connection and engage the flange parts, or "flanges" as they are usually called. To connect the two members together in position around the flanges, each member is provided with lugs 25a and 25b at each end. The lugs are drilled to allow bolts 26 to pass through the lugs and, by means of nuts 27, rigidly connect the two sections together.

FIG. 3 shows how the two members are bolted together around the flanges. Lock washers 29 can be used between the bolt head and the lugs, and the lugs and the nut, if desired.

FIG. 2 is a cross-sectional view of a typical flange connection with the protector in place. As shown, upper flange 34 is connected to lower flange 35 by means of bolts 36 and nuts 37. Each flange is provided with identical grooves 38 to receive the metal ring gasket 39 and make sealing engagement therewith. Since all of the force of bolts 36 must be transmitted to ring gasket 39 in order to maintain it in sealing engagement with grooves 38, the thickness of the ring gasket and the depths of the grooves is such that flanges 34 and 35 are held apart by the ring gasket. Otherwise, of course, there would be a limit to the amount of force existing between the ring gasket and the flanges and this would limit the amount of pressure the flange connection could contain.

The outer peripheries of flanges 34 and 35 are beveled on approximately a 45° angle. This is generally true of most flanges of this type as it is required by the American Petroleum Institute. As shown in FIG. 2, the protector is provided with an inwardly extending portion 24c on its inner periphery which has diverging surfaces to engage opposed areas (beveled edges 34' and 35') on the flanges 34 and 35. Preferably, the inner portion is designed to provide a sufficient seal around the flanges to protect the connection from ingress of dust, salt air and the like and also to stabilize the flanges on the ring gasket. The protector of this invention can perform either or both of these functions depending on the configuration of its inner portion which engages the flanges and upon the material from which it is made.

To stabilize the connection, inner portion 24c is preferably shaped to exert a wedging action on the flanges so that when the protector is assembled around the connection, the tightening of bolts 26 will cause inner portion 24c to exert a separating force on the flanges. Conversely, any tendency of the flanges to rock on the ring gasket will cause the flanges to exert a force on inner portion 24c tending to move it laterally to allow the edges of the flanges on one side of the connection to move together. Such lateral movement is resisted by bolts 26 which hold the protector and its inner portion in position. Thus, the protector provides a stabilizing force acting to resist any relative movement of the flanges, at the point where it is most effective for this purpose—at the outer edge of the flanges.

To prevent corrosion from occurring on the outside surface of seal ring 38 or between the opposing faces of the flanges which make up the joint, the inner portion of the protector is arranged to sealingly engage the outer edge of the flanges to at least substantially serve as a low pressure seal or retainer for a non-corrosive filler material such as grease. Thus, in the preferred embodiment illustrated in the drawings, the inner portion 24c extends completely around the inner periphery of arcuate members 24a and 24b; and except for the gap between the members, it completely seals space 40 between the flanges.

The members are designed so that when they are in position encircling the flanges, a gap or space will exist between their ends of from ⅛ to ⅜ of an inch. This is done to make sure that the two members will not engage even though the outside diameters of the flanges vary within manufacturing tolerances, for if they do engage, it will limit the force the members exert on the flanges and thereby limit their ability to provide a seal between the flanges and/or prevent relative movement of the flanges, as the case may be.

To complete the isolation of space 40, gaskets 28 are placed in the gap between lugs 25a and 25b on members 24a and 24b to seal between the members and to also sealingly engage the beveled edge of the flanges. Thus, in the preferred embodiment of the invention, the protector is provided with an inwardly extending portion which engages the outer beveled edges of the flanges and exerts a wedging action on them to stabilize the flanges with respect to the seal ring of the joint and also seals around the outer edge of the flanges to help protect the seal ring and the opposing surfaces of the flanges from corrosion.

The seal produced by the inwardly extending portion of the protector need not be gas tight. In most cases, all that is required is a seal sufficient to maintain space 40 filled with a non-corrosive material as, for example, a viscous liquid such as grease, plastic packing, or some other non-corrosive, preferably highly viscous, liquid. To fill the space, hole 49 can be drilled laterally through the protector and tapped to receive conventional grease fitting 50 so that the space can not only be initially filled with grease or similar liquid but also so that the supply of viscous liquid in the space can be replenished from time to time as required.

If the protector is to act as a stabilizer, it must have sufficient strength to withstand substantial forces which may be imposed upon it by the flanges as a result of the lateral forces exerted on the members interconnected by the flanges so, consequently, the protector should be made of a strong, preferably resilient material such as steel. Conversely, if the protector is to be used only to seal the outer peripheries of the flanges, then it can be made from a relatively soft material having relatively little structural strength, such as one of the readily moldable plastics. When the protector is to perform both functions, since the beveled edges of flanges vary in smoothness, it may desirable to use a material having high structural strength such as steel for the body of the protector and then coat the inwardy extending portion which engages the flanges with a deformable, relatively soft material which can shape itself to the irregularities of the flanges and form the required seal, whereas the steel core underneath can provide the strength necessary to stabilize the flanges against rocking.

The protector is illustrated as having an inner portion which extends completely around its inner periphery so that only across the gap between the ends of members 24a and 24b are the flanges unsupported. This is not necessary if only stabilization of the flanges is desired. For example, the protector could be provided with several short inwardly extending portions at spaced intervals around its inner periphery and provide similar stabilization to the flanges. The short portions would not even need to be arcuate if they are relatively short.

FIGURE 6 illustrates the preferred embodiment of the invention for use with the type ring and groove joint in which the flange parts do not have opposed surfaces of the same diameter as, for example, the joints illustrated in FIG. 1 between casing head 14 and branch 17, and tubing head 15 and branch 16. FIG. 6 is a sectional view through a portion of the connection between casing head 14 and lateral branch 17.

This connection is identical with any conventional ring and groove type pressure connection except that one flange part has a larger flat surface than the other. Thus, the side of casing head 14 is machined flat to provide a flat surface 44 which is drilled and tapped and provided with studs 41 which are used to attach flange part 42 to the head. Surface 44 is grooved at 43 to receive ring gasket 46 which also engages groove 47 in flange 42. Since one of the flange parts making up the joint has a flat surface having a diameter considerably larger than the flat surface of the other, protector 45 is modified by providing it with an inwardly extending portion 45c which has an inclined surface 45d to engage the beveled edge 42' of flange part 42 and a horizontal surface 45e to engage flat surface 44 of the opposite flange part of the connection. The inner portion 45c functions in exactly the same manner as did the inwardly extending portion 24c on the previously described protector in that it can stabilize the connection by exerting a wedging force against the two parts making up the connection, urging them apart and consequently resisting any rocking of one part toward the other. It can also sealingly engage the two flange parts to seal the space between them on the outside of the seal ring to allow this space to be filled with a non-corrosive liquid to protect the seal ring and this portion of the flange connection against corrosion. This embodiment of the invention is also provided with an opening 49' which is tapped to receive a conventional grease fitting 50' to allow the space to be filled with grease, etc. and to allow the supply to be replenished when necessary.

In addition to helping to protect the area between the flanges from corrosion, a wellhead equipped with these protectors, such as the one in FIG. 1, can be spray-coated with any of several well known plastic materials and completely isolated from its environment, thus obtaining 100% protection against corrosion. This is possible because the protector can be coated over, making a weather proof joint.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other feautres and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A flange joint including two parts having opposed surfaces each provided with opposed grooves, a metallic ring gasket located in the grooves and holding the opposed surfaces spaced apart and a plurality of bolts spaced around the outside of the ring gasket and extending through the two parts and equipped with nuts to pull the two parts against the ring gasket; a protector comprising at least two members assembled in encircling relationship to said parts; force applying means to hold said members in encircling relation to said parts; a portion of each of said members extending inwardly between said opposing surfaces of said parts, the interface between said opposed surfaces and said portions including oppositely tapered faces together constituting a wedge means in cross section to provide seating surfaces inclined at an angle to thereby form a seat, said portions of said protector being made of a material having sufficient hardness, rigidity, and compressive strength to exert a wedging action against the two parts urging them apart and to hold the parts against rocking on the ring gasket without substantial deformation of said members to stabilize the joint; said protector members, when assembled in position to stabilize the joint, having a combined arcuate length of slightly less than 360° whereby the engagement of said inwardly extending portions of said protector members with the opposed surfaces of said parts is not prevented by abutment of the ends of said protector members.

2. The combination of claim 1 in which the oppositely tapered faces are located on the portions of the members that extend inwardly between the opposed surfaces.

3. The combination of claim 2 in which the opposed surfaces taper at the interface between the opposed surfaces and the portions at the same angle as the oppositely tapered faces on the portions.

4. The combination of claim 1 in which the interface between the portions and the opposed surfaces includes oppositely tapered faces on the portions and beveled outer edges on the opposed surfaces, said beveled edges being oppositely tapered at the same angle as the faces.

5. The combination of claim 1 further provided with gasket means of readily deformable material located between and in engagement with the ends of the members to allow the annular space between the opposed surfaces bounded by the members and the ring gasket to be maintained full of non-corrosive fluid.

References Cited by the Examiner

UNITED STATES PATENTS

| 1,781,849 | 11/1930 | Kiesel | 285—405 |
| 2,271,549 | 2/1942 | Henderson | 285—45 |
| 2,523,928 | 9/1950 | Szekely | 285—330 |
| 2,543,963 | 3/1951 | Gaffin | 285—373 |
| 2,547,321 | 4/1951 | Henderson | 285—363 |
| 2,830,665 | 4/1958 | Burns | 285—140 |
| 2,985,435 | 5/1961 | Gross | 285—373 |

FOREIGN PATENTS

| 860,626 | 2/1961 | Great Britain. |

CARL W. TOMLIN, *Primary Examiner.*